(12) United States Patent
Boenisch (10) Patent No.: US 10,921,286 B2
(45) Date of Patent: Feb. 16, 2021

(54) IN-LINE INSPECTION TOOL

(71) Applicant: INNOSPECTION GROUP LIMITED, Aberdeen (GB)

(72) Inventor: Andreas Boenisch, Schwarmstedt (DE)

(73) Assignee: Innospection Group Limited, Aberdeen (GB)

( * ) Notice: Subject to any disclaimer, the term of this patent is extended or adjusted under 35 U.S.C. 154(b) by 202 days.

(21) Appl. No.: 15/565,059

(22) PCT Filed: Apr. 7, 2016

(86) PCT No.: PCT/GB2016/050983
§ 371 (c)(1),
(2) Date: Oct. 6, 2017

(87) PCT Pub. No.: WO2016/162683
PCT Pub. Date: Oct. 13, 2016

(65) Prior Publication Data
US 2018/0106762 A1 Apr. 19, 2018

(30) Foreign Application Priority Data
Apr. 7, 2015 (GB) .................................. 1505888.6

(51) Int. Cl.
*G01N 27/82* (2006.01)
*G01N 27/9013* (2021.01)
(Continued)

(52) U.S. Cl.
CPC .............. *G01N 27/82* (2013.01); *F16L 55/28* (2013.01); *G01N 27/902* (2013.01); *F16L 2101/30* (2013.01)

(58) Field of Classification Search
None
See application file for complete search history.

(56) References Cited

U.S. PATENT DOCUMENTS 2,194,537 A 3/1940 Adams
2,255,053 A 9/1941 Gunn
(Continued)

FOREIGN PATENT DOCUMENTS

DE 2645274 A1 4/1977
DE 4118406 A1 12/1991
(Continued)

OTHER PUBLICATIONS

International Search Report and Written Opinion dated Jul. 14, 2016 from International Patent Application No. PCT/GB2016/050983, filed Apr. 7, 2016.
(Continued)

*Primary Examiner* — Jas A Sanghera
(74) *Attorney, Agent, or Firm* — David B. Tingey; Bryant J. Keller; Kirton McConkie (57) ABSTRACT

An untethered in-line inspection tool for the non-destructive testing of a tubular test component is described which comprises one or more partial saturation eddy current testing (PSET) modules configured to locate with an internal surface of the test component. The one or more PSET modules comprise a variable strength permanent magnet for generating a variable DC magnetic field within the test component and at least one eddy current sensor. Having an in-line inspection tool that employs PSET techniques allows the in-line inspection tool to operate with an increased range of pipeline types. For the detection of cracks the in-line inspection tool may also comprise one or more crack detection modules. The in-line inspection tool further comprises one or more battery modules. Employing a dedicated battery module removes any need to employ an umbilical or wireline in order to provide power to one or more electromagnets.

25 Claims, 4 Drawing Sheets

(51) Int. Cl.
*F16L 55/28* (2006.01)
*F16L 101/30* (2006.01)

(56) References Cited

U.S. PATENT DOCUMENTS

| | | | |
|---|---|---|---|
| 2,573,799 | A | 11/1951 | MacLean |
| 3,060,377 | A | 10/1962 | Schmidt |
| 3,205,435 | A | 9/1965 | Nuttall |
| 3,535,624 | A | 10/1970 | Wood |
| 3,693,075 | A | 9/1972 | Forster |
| 3,916,302 | A | 10/1975 | Madawell |
| 4,292,589 | A | 9/1981 | Bonner |
| 4,553,095 | A | 11/1985 | Schenk, Jr. et al. |
| 4,621,532 | A | 11/1986 | Takagi et al. |
| 4,675,604 | A | 6/1987 | Moyer et al. |
| 4,855,676 | A | 8/1989 | Cecco et al. |
| 4,878,180 | A | 10/1989 | McWhirter et al. |
| 4,955,235 | A | 9/1990 | Metala et al. |
| 5,117,182 | A | 5/1992 | Cecco et al. |
| 5,130,652 | A | 7/1992 | Kawakami et al. |
| 5,237,270 | A | 8/1993 | Cecco et al. |
| 5,285,689 | A | 2/1994 | Hapstack et al. |
| 5,345,514 | A | 9/1994 | Mahdavieh et al. |
| 5,479,100 | A | 12/1995 | Fowler et al. |
| 5,565,633 | A | 10/1996 | Wernicke |
| 5,628,667 | A | 5/1997 | Levi |
| 5,751,144 | A | 5/1998 | Weischedel |
| 5,850,034 | A | 12/1998 | Hugens, Jr. |
| 6,037,767 | A | 3/2000 | Crescenzo et al. |
| 6,220,099 | B1 | 4/2001 | Marti et al. |
| 6,281,678 | B1 | 8/2001 | Auville |
| 6,344,739 | B1 | 2/2002 | Hardy et al. |
| 6,396,262 | B2 | 5/2002 | Light et al. |
| 6,501,266 | B1 * | 12/2002 | Krivoi ............... G01N 27/83 324/238 |
| 6,762,602 | B1 | 7/2004 | Laursen et al. |
| 6,847,207 | B1 * | 1/2005 | Veach ............... F16L 55/26 324/220 |
| 7,518,359 | B2 | 4/2009 | Wang et al. |
| 7,750,626 | B2 | 7/2010 | Lefebvre et al. |
| 8,536,860 | B2 | 9/2013 | Boenisch |
| 9,030,196 | B2 | 5/2015 | Boenisch |
| 9,213,018 | B2 | 12/2015 | Boenisch |
| 9,285,345 | B2 | 3/2016 | Boenisch |
| 2002/0011124 | A1 * | 1/2002 | Phipps ............ B08B 9/0551 73/865.8 |
| 2002/0033049 | A1 | 3/2002 | Amini |
| 2002/0093343 | A1 | 7/2002 | Amini |
| 2003/0057943 | A1 | 3/2003 | McClelland |
| 2003/0080735 | A1 | 5/2003 | Wache |
| 2003/0117134 | A1 * | 6/2003 | Almaguer ............ G01N 27/82 324/221 |
| 2003/0117142 | A1 | 6/2003 | Amini |
| 2003/0233880 | A1 | 12/2003 | Siverling et al. |
| 2004/0239345 | A1 | 12/2004 | Amini |
| 2006/0220640 | A1 * | 10/2006 | Thompson ............ F16L 55/40 324/220 |
| 2007/0022830 | A1 * | 2/2007 | Mandziuk ............ F16L 55/40 73/865.8 |
| 2008/0092672 | A1 | 4/2008 | Gibson et al. |
| 2008/0313915 | A1 | 12/2008 | Dos Santos et al. |
| 2009/0166035 | A1 | 7/2009 | Almaguer |
| 2010/0117635 | A1 | 5/2010 | Hoyt |
| 2010/0126278 | A1 | 5/2010 | Kubota et al. |
| 2011/0191045 | A1 * | 8/2011 | Boenisch ............ G01N 27/902 702/65 |
| 2011/0234212 | A1 | 9/2011 | LePage et al. |
| 2012/0306483 | A1 | 12/2012 | Boenisch |
| 2013/0234701 | A2 * | 9/2013 | Boenisch ........... G01N 27/9033 324/239 |
| 2016/0258568 | A1 * | 9/2016 | Mayorov ............ H04Q 9/00 |

FOREIGN PATENT DOCUMENTS

| | | |
|---|---|---|
| DE | 29608664 U1 | 9/1997 |
| DE | 19714685 A1 | 10/1997 |
| DE | 19726513 A1 | 1/1999 |
| DE | 10237980 A1 | 7/2003 |
| DE | 102007004223 A1 | 7/2008 |
| EP | 0301906 A | 2/1989 |
| EP | 1063521 A1 | 12/2000 |
| EP | 1717412 A1 | 2/2006 |
| GB | 2187558 A1 | 9/1987 |
| GB | 2245071 A1 | 12/1991 |
| GB | 2429254 A | 2/2007 |
| GB | 2462193 A | 2/2010 |
| JP | 05281198 A | 4/1992 |
| JP | 08136509 A | 11/1994 |
| JP | 10318987 A | 12/1998 |
| JP | 11142577 A | 5/1999 |
| JP | 2001228120 A | 2/2000 |
| WO | 2002/16184 A1 | 2/2002 |
| WO | 2002088627 A1 | 11/2002 |
| WO | 2006/113504 A | 10/2006 |
| WO | 20070130662 A2 | 11/2007 |
| WO | 2008/090370 A2 | 7/2008 |

OTHER PUBLICATIONS

Sadek H.M. "NDE Technologies for the Examination of Heat Exchangers and Boiler Tubes-Principles, Advantages and Limitations", Insight vol. 48, No. 3, Mar. 1, 2006, pp. 181-183, XP002486275.
A. Boenisch: "Magnetic Flux and SLOFEC Inspection of Thick Walled Components", Proc. 15th World Conference on Nondestructive Testing, Oct. 15, 2000 (Oct. 15, 2000), Oct. 21, 2000 (Oct. 21, 2000), pp. 1-8, XP002623467, Retrieved from the Internet: URL:http://www.ndt.net/article/wcndt00/papers/idn352/idn352.htm [retrieved on Feb. 17, 2011].
Kontroll Technick: "SLOFEC—Saturation Low Frequency Eddy Current", Feb. 18, 2004 (Feb. 18, 2004), XP002623468, Retrieved from the Internet: URL:http://www.kontrolltechnik.com/Bilder/PDF/ProsSlofec.pdf [retrieved on Feb. 17, 2011].
International Preliminary Report on Patentability dated Oct. 10, 2017 from International Patent Application No. PCT/GB2016/050983, filed Apr. 7, 2016.
International Search Report and Written Opinion dated Mar. 24, 2011 from International Patent Application No. PCT/GB2010/051891, filed Nov. 12, 2010.
International Preliminary Report on Patentability dated May 22, 2012 from International Patent Application No. PCT/GB2010/051891, filed Nov. 12, 2010.
Office Action dated Nov. 29, 2013 from U.S. Appl. No. 13/509,781, filed Feb. 6, 2013.
Office Action dated Aug. 6, 2014 from U.S. Appl. No. 13/509,781, filed Feb. 6, 2013.
Office Action dated Apr. 23, 2015 from U.S. Appl. No. 13/509,781, filed Feb. 6, 2013.
Notice of Allowance dated Nov. 6, 2015 from U.S. Appl. No. 13/509,781, filed Feb. 6, 2013.
Office Action dated Nov. 3, 2016 from U.S. Appl. No. 15/015,027, filed Feb. 3, 2016.
Office Action dated Aug. 8, 2017 from U.S. Appl. No. 15/015,027, filed Feb. 3, 2016.
International Search Report and Written Opinion dated Jul. 10, 2008 from International Patent Application No. PCT/GB2008/000288, Jan. 28, 2008.
International Preliminary Report on Patentability dated Apr. 7, 2009 from International Patent Application No. PCT/GB2008/000288, Jan. 28, 2008.
Office Action dated Dec. 21, 2011 from U.S. Appl. No. 12/524,700, filed Jul. 27, 2009.
Office Action dated Aug. 30, 2012 from U.S. Appl. No. 12/524,700, filed Jul. 27, 2009.
Notice of Allowance dated May 23, 2013 from U.S. Appl. No. 12/524,700, filed Jul. 27, 2009.

(56) References Cited

OTHER PUBLICATIONS

International Search Report and Written Opinion dated Nov. 24, 2009 from International Patent Application No. PCT/GB2009/050940, filed Jul. 29, 2009.
International Preliminary Report on Patentability dated Feb. 1, 2011 from International Patent Application No. PCT/PCT/GB2009/050940, filed Jul. 29, 2009.
Office Action dated May 24, 2013 from U.S. Appl. No. 13/056,288, filed Mar. 11, 2011.
Office Action dated Feb. 21, 2014 from U.S. Appl. No. 13/056,288, filed Mar. 11, 2011.
Notice of Allowance dated Feb. 2, 2015 from U.S. Appl. No. 13/056,288, filed Mar. 11, 2011.
International Search Report and Written Opinion dated Mar. 28, 2011 from International Patent Application No. PCT/GB2010/051892, filed Nov. 12, 2010.
International Preliminary Report on Patentability dated May 22, 2012 from International Patent Application No. PCT/GB2010/051892, filed Nov. 12, 2010.
Office Action dated Nov. 22, 2013 from U.S. Appl. No. 13/509,779, filed Aug. 21, 2012.
Office Action dated Feb. 9, 2015 from U.S. Appl. No. 13/509,779, filed Aug. 21, 2012.
Notice of Allowance dated Sep. 21, 2015 from U.S. Appl. No. 13/509,779, filed Aug. 21, 2012.

* cited by examiner

IN-LINE INSPECTION TOOL

CROSS REFERENCE TO RELATED APPLICATION(S)

This application is a U.S. National Stage Entry of International Patent Application No. PCT/GB2016/050983, filed Apr. 7, 2016, which claims the benefit of United Kingdom Patent Application No. 1505888.6, filed Apr. 7, 2015, the disclosures of which are hereby incorporated entirely herein by reference.

The present invention relates to non-destructive testing, and in particular to an in-line inspection tool for the inspection of the condition of tubular components. Particular applications of the invention include the inspection of pipeline walls that are often remotely located within the oil and gas exploration and production industries.

In the oil and gas industry a "pig" is a device that is inserted into a pipeline and which travels freely through it, often driven by the product flow, to do a specific task within the pipeline. These tasks fall into a number of different areas:

(a) Utility pigs which perform a function such as cleaning, separating products in-line or dewatering the line;
(b) In-line inspection pigs which are used to provide information on the condition of the pipeline and the extent and location of any problem (such as corrosion for example); and
(c) special duty pigs such as plugs for isolating different fluids flowing through the pipeline.

In-line inspection pigs are required to satisfy the on-going need of operators to be able to monitor the structural integrity of the tubular components e.g. pipelines employed as fluid conduits within the hydrocarbon production industry since the presence of cracks or flaws in these pipelines can be disastrous.

To date the main inspection methods employed within known in-line inspection pigs are those based on the principles of Magnetic Flux Leakage (MFL) and Ultrasound.

The basic principle is of MFL testing is that a powerful magnet field is employed to magnetise the component to be tested. At areas where there is corrosion or missing metal, the magnetic field "leaks" from the component and is detected by a MFL probe. The method is therefore limited to use with ferromagnetic materials. For a proper repeatable signal it is important to be able to fully magnetise the test component to saturation. The need for a powerful magnet field means that within the oil and gas exploration and production industries electromagnetic have been employed to generate the required magnetic field.

Ultrasound testing involves introducing a high frequency sound wave into a tubing wall, and the subsequent detection and analysis of the reflected sound waves so as to allow information on the wall thickness to be derived. Generally the operation of ultrasound tools requires good acoustic coupling between the contact transducers and the test object. EMAT (Electromagnetic Acoustic Transducer and phased Array Ultrasound are regarded as extended Ultrasound techniques.

New types of pipelines are increasingly being employed in the oil and gas industry in order to allow for the safe transport of corrosive products under high pressure. These new types of pipelines include: corrosion resistant alloy (CRA) lined pipes; CRA clad pipes; solid CRA pipes; duplex pipes; super duplex pipes; solid carbon steel pipes and heavy wall pipes employed for the transportation of dry gas. In general these new types of pipeline have a thickness that is greater than those traditionally used.

Existing in-line inspection tools are therefore increasingly being found to be incapable of reliably monitoring the condition of such pipelines. Firstly, ultrasound tools operating according to the contact method require good coupling between the contact transducers and the test object, and the large mismatch in the acoustic impedance of air and the acoustic impedance of the test material must be overcome. This requires the use of a couplant, for example a liquid or gel-like material that has a low acoustic impedance mismatch and therefore good acoustic coupling between the transducers and the tubular. Couplant variations create inconsistencies in the measured data, and in some test environments (such as high temperature environments) there may be significant difficulties associated with achieving appropriate couplant distribution and consistency, and difficulties in preventing degradation of the couplant material. This issue is exacerbated within non bonded CRA lined, non bonded clad pipes or non bonded lined pipes as these tools cannot efficiently couple to such main pipe walls. In this case these tools may be only capable of limited inspection of the internal liner or cladding as the generated ultrasonic pulses are not able to propagating beyond the non bonded CRA layers, clads or liners.

When MFL testing techniques are employed, the relationship of the pipeline thickness to inner diameter often does not allow for sufficient magnetisation (e.g. saturation) of the pipeline to occur. As a result MFL techniques are often only operable to a limited depth within the walls of these newer types of pipeline.

Due to the power consumption and data storage requirements of in-line inspection pigs those devices known in the art require to be of a tethered design i.e. they are deployed on a wireline or an umbilical so as to provide a means for supplying the required power for all of the components located within the pig and for transmitting the generated data to a remote location for storage and analysis purposes.

SUMMARY OF INVENTION

One aim and object of aspects of the present invention is to provide a method and apparatus which overcomes or mitigates the drawbacks of prior art in-line inspection tools. A further aim and object of aspects of the invention is to provide an alternative method and apparatus to those proposed in the prior art and in particular one that is suited for deployment with newer pipeline types. Additional aims and objects will become apparent from reading the following description.

According to a first aspect of the present invention there is provided an untethered in-line inspection tool for the non-destructive testing of a tubular test component, the in-line inspection tool comprising one or more partial saturation eddy current testing (PSET) modules configured to locate with an internal surface of the test component, the one or more PSET modules comprising a variable strength permanent magnet for generating a variable DC magnetic field within the test component and at least one eddy current sensor.

Having an in-line inspection tool that employs PSET techniques allows the in-line inspection tool to operate with the a wider range of pipeline types, and in particular the new types of pipelines being employed within the oil and gas industry e.g. CRA lined pipes; CRA clad pipes; solid CRA pipes; duplex pipes; super duplex pipes; solid carbon steel pipes and heavy wall pipes. The reduced power requirements of PSET, when compared to other non-destructive testing techniques, and increased data storage capacity of control and data storage modules results in the an inspection tool that can be of an untethered or free swimming design i.e. the inspection tool does not required to be tethered to the surface with a wireline or an umbilical. This provides the presently described inspection tool with a greater degree of flexibility when compared to those tethered in-line inspection tools known in the art.

Most preferably the untethered in-line inspection tool further comprises one or more battery modules.

Employing a dedicated battery module for the in-line inspection tool is possible because PSET techniques require significantly lower levels of magnetisation of the test component when compared with the known testing techniques e.g. MFL testing. As a result, the full functionality of the in-line inspection tool can be achieved with a permanent DC magnet source and so removes any need to employ an umbilical or wireline in order to provide power to one or more electromagnets.

Preferably one of the one or more battery modules comprises switch-on electronics. This battery module therefore acts as the master battery module.

The in-line inspection tool may further comprise one or more a crack detection modules. The crack detection module may comprise at least one eddy current sensor. It is advantageous for the in-line inspection tool to comprise a separate crack detection module since such components are found to be more reliable for detecting cracks embedded within welds of a pipeline and are also found to be able to detecting cracks that are smaller in length.

Optionally the in-line inspection tool further comprises a marker and tow module. The marker and tow module may comprise a transmitter that provides a means for the location of the in-line inspection tool to be tracked. Preferably the marker and tow module comprises a dedicated power source. The marker and tow module may comprise one or more sealing cups.

Optionally the in-line inspection tool further comprises an odometer. The odometer may comprise a means for recording distance information.

Most preferably the in-line inspection tool further comprises a control and data storage module. The control and data storage module may comprise an interface connector that provides a wireless communication means for the in-line inspection tool.

Preferably the one or more PSET modules comprise a PSET electronics module and a PSET magnetiser and sensors module wherein the PSET electronics module receives and processes analogue measurement signals detected by one or more sensors of the PSET magnetiser and sensors module.

Most preferably the one or more PSET modules comprise one or more PSET unit wherein the one or more PSET units comprises the variable permanent magnet and the at least one eddy current sensor. The PSET unit may be pivotally mounted between stabiliser wheels.

Preferably the at least one eddy current sensor is located between poles of the variable permanent magnet.

Most preferably the variable permanent magnet comprises a backing plate connected between the poles wherein the backing plate is moveable relative to the poles so as to provide a means for adjusting the strength of the DC magnetic field generated by the permanent magnet.

According to a second aspect of the present invention there is provided a method of non-destructive testing of a tubular test component the method comprising;
   setting a DC magnetic field strength of a variable magnet of an untethered in-line inspection tool to a level where the flux density within the tubular test component will experience a maximum rate of change;
   locating the untethered in-inline inspection tool within the tubular test component so as to partially saturate the tubular test component with the set DC magnetic field;
   employing at least one eddy current sensor of the in-line inspection tool to perform an eddy current test on the partially saturated tubular test component.

Most preferably the eddy current test comprises a differential mode eddy current test.

The differential eddy current test may comprise detecting the amplitude and a phase of one or more eddy current signals. Preferably the detected amplitude and phase of the one or more eddy current signals are employed to identify one or more defects within the tubular test component.

For varying defect detection criteria of the untethered in-line inspection tool, single or multiple eddy current sensors of the absolute mode, multi-differential mode, transmission/receive coil mode or semi transmission mode may be implemented in the tool.

Setting the DC magnetic field strength of the variable magnet of the untethered in-line inspection tool may comprise:
   locating the untethered in-line inspection tool with a first surface of a reference sample the reference sample comprising an artificial defect incorporated on a second, opposite surface thereof;
   varying the DC magnetic field strength of the variable magnet to ascertain the DC magnetic field strength that coincides with the maximum amplitude of a signal detected by the eddy current sensor.

The method preferably comprises recording PSET data results as the untethered in-line inspection tool travels through the tubular test component.

The method may further comprise recording the distance covered and or velocity of the untethered in-line inspection tool as it travels through the tubular test component.

Preferably the method further comprises employing at least one eddy current sensor of the untethered in-line inspection tool to perform an eddy current test on a non-saturated tubular test component. Such tests are found to be useful for detecting the presence of cracks within the tubular test component.

Optionally a test run of the untethered in-line inspection tool comprises one or more passes of the in-line inspection tool along the tubular test component.

Embodiments of the second aspect of the invention may comprise preferable or optional features of the untethered in-line inspection tool of the first aspect of the invention, or vice versa.

According to a third aspect of the present invention there is provided a method of setting the DC magnetic field strength of a variable magnet of a PSET unit the method comprising:
   locating the PSET unit with a first surface of a reference sample the reference sample comprising an artificial defect incorporated on a second, opposite surface thereof;
   varying the DC magnetic field strength of the variable magnet to ascertain the DC magnetic field strength that coincides with the maximum amplitude of a signal detected by an eddy current sensor of the PSET unit.

Most preferably the eddy current sensor is operated in a differential mode. Eddy current sensors of the absolute mode, multi-differential mode, transmission/receive coil mode or semi transmission mode may be operated.

Embodiments of the third aspect of the invention may comprise preferable or optional features of the first and second aspects of the invention, or vice versa.

BRIEF DESCRIPTION OF DRAWINGS

There will now be described, by way of example only, various embodiments of the invention with reference to the drawings, of which.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Figure 1:
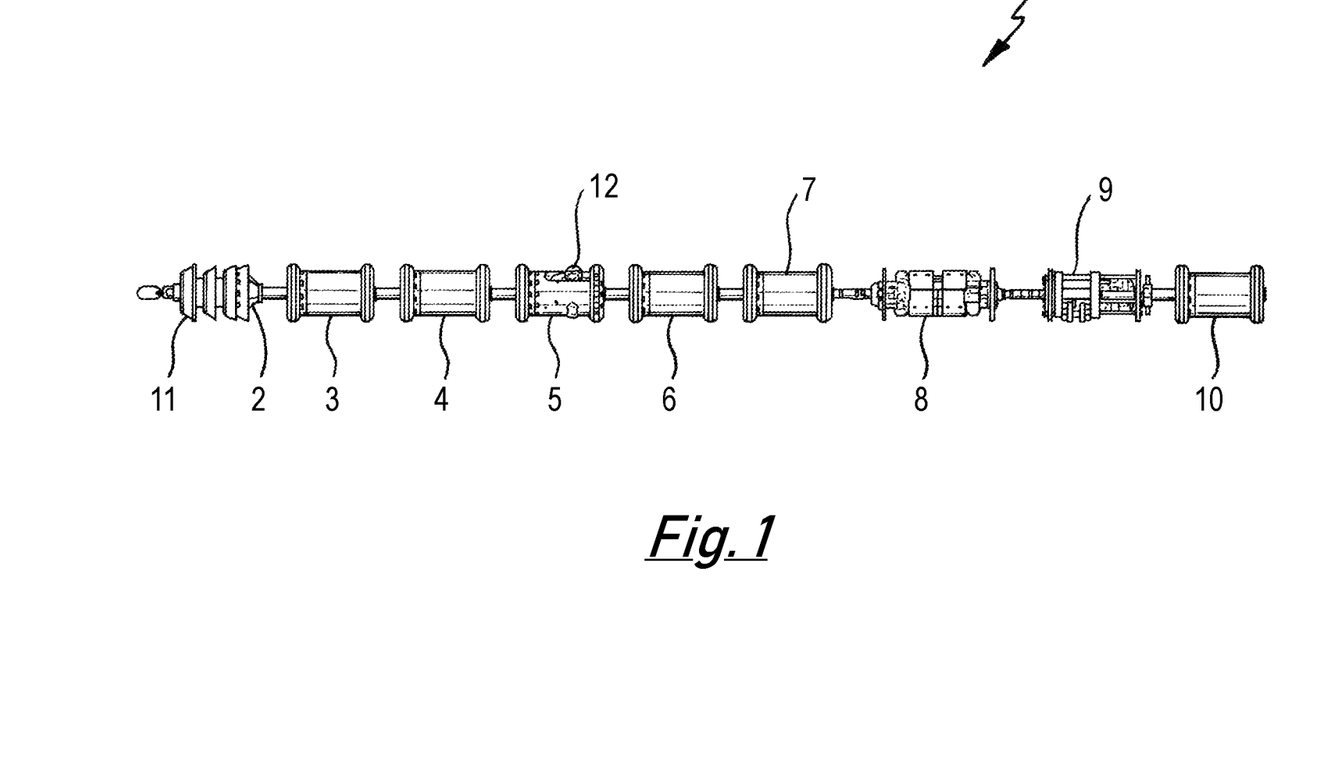
FIG. 1 presents a schematic representation of an untethered in-line inspection tool in accordance with an aspect of the present invention.

An untethered in-line inspection tool 1 in accordance with an aspect of the present invention will now be described with reference to FIG. 1. In particular, FIG. 1 presents a schematic representation of the untethered in-line inspection tool 1 which, moving from left to right, can be seen to comprise: a marker and tow module 2; two battery modules 3 and 4; an odometer 5; a control and data storage module 6; a partial saturation eddy current testing (PSET) electronics module 7; a PSET magnetiser and sensors module 8; a crack sensor module 9 and a crack testing electronics module 10. The function of each of these individual components will now be described in turn.

The marker and tow module 2 comprises a low frequency transmitter coil (not shown) that allows the location of the in-line inspection tool 1 to be tracked. This module preferably carries its own power source e.g. a battery, which maintains the operation of the transmitter even when the rest of the tool is switched off or if the tool's two battery modules 3 and 4 are spent. The marker and tow module 2 effectively tows the rest of the untethered in-line inspection tool 1. Therefore, the marker and tow module 2 is equipped with a suitable number of sealing cups 11.

The battery modules 3 and 4 preferably consist of a master module 4 that comprises battery cells and switch-on electronics and a slave module 3, which carries battery cells only. Due to the fact, that the slave modules are cascadable, more slave modules 3 can be simply be added as and when required, e.g. for use in longer pipelines.

The odometer 5 comprises one or more wheels 12 that feed the calculation of a virtual odometer wheel (not shown) in order to produce information about the distance covered, and the speed of the in-line inspection tool 1. The odometer 5 also provides a means for the recorded distance information to be assigned to the acquired inspection data.

The control and data storage module 6 contains the tool control unit (not shown), which steers the overall untethered in-line inspection tool 1 in accordance with the input parameters. This module 6 communicates wirelessly via an interface connector (not shown) with the outside world e.g. a laptop employed to operate the untethered in-line inspection tool 1. Preferably the control and data storage module 6 comprises one or more flash memory cards for recording the inspection data. Upon completion of a test run the inspection data is simply downloaded to a laptop, or a USB memory unit, for further processing.

The function of the PSET electronics module 7 is to receive the analogue measurement signals from the eddy current sensors 13 contained within the PSET magnetiser and sensors module 8. After multiplexing and sampling these measurement signals, the PSET electronics module 7 arranges the inspection data into files. The files are then transmitted to the control and data storage module 6 for storage.

Figure 2:
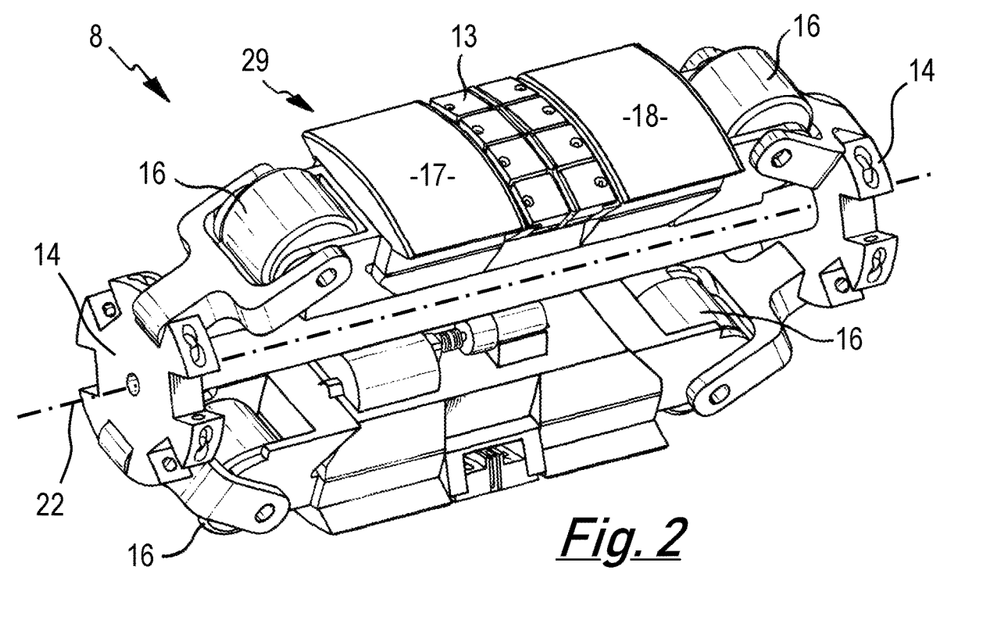
FIG. 2 presents a perspective view of a PSET magnetiser and sensors module incorporated within the untethered in-line inspection tool of FIG. 1.

Further details of the PSET magnetiser and sensors module 8 are provided within FIG. 2. The PSET magnetiser and sensors module 8 can be seen to comprise a substantially cylindrical shape with universal joints 14 mounted at respective opposing ends. Two, or more, PSET units 15 are located between the universal joints 14. Further details of the PSET units 15 are provided below with reference to FIG. 3. Pivotally mounted between the ends of each PSET units 15 and a respective universal joint are four stabiliser wheels 16.

Figure 3:
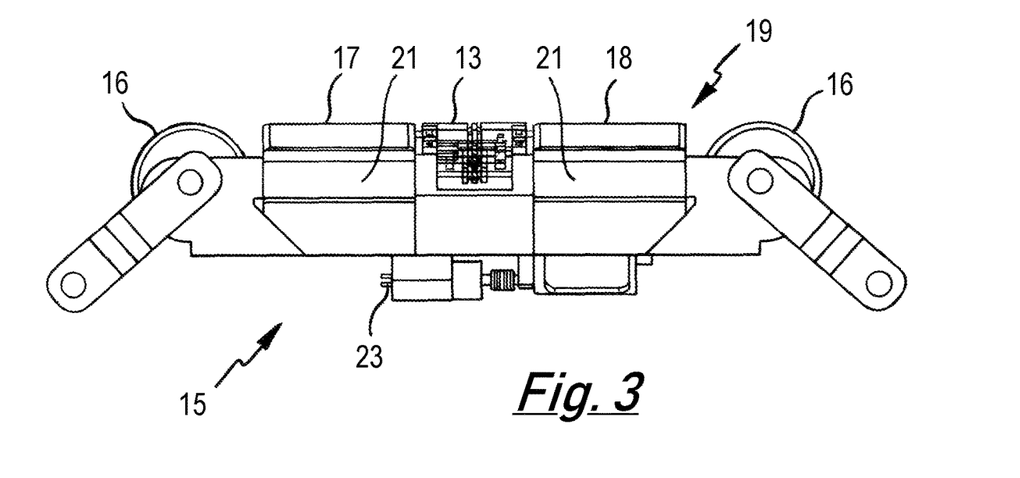
FIG. 3 presents a perspective view of a PSET units incorporated within the PSET magnetiser and sensors module of FIG. 2.

As can be seen from FIG. 3, each PSET unit 15 comprises an array of eddy current sensors 13 located approximately centrally between pole shoes 17 and 18 of a permanent magnet 19. The permanent magnets 19 and eddy current sensors 13 are held at a predetermined constant distance from the surface of the tubular by the stabiliser wheels 16.

The pole shoes 17 and 18 of the permanent magnet 19 are arranged to apply a DC magnetic field 20 to the tubular in the volume radially adjacent the array of eddy current sensors 13. The presence of a backing plate 21, connected between the rear of the poles 17 and 18, and which is moveable in a direction substantially parallel to an axis 22 of the PSET magnetiser and sensors module 8 provides a means for adjusting the strength of the applied DC magnetic field 20.

The PSET units 15 are connected by cables 23 to the PSET electronics module 7.

Each PSET unit 15 is operable in an eddy current differential mode, which is highly sensitive to localised defects in the tubular. The PSET unit 15 may also be selectively operable in an absolute mode, multi-differential mode, transmission/receive coil mode or semi transmission mode. However, as discussed in further detail below with reference to FIG. 4, since PSET is principally a measurement of relative changes in permeability, in practice the technique is most useful when exploited in the differential mode, used to detect and analyse localised defects such as small pits and flaws.

The crack sensor module 9 comprises transmission and receive eddy current detection based crack sensors (not shown) which are preferably accommodated within plastic housings. The crack testing electronics module 10 is employed to receive the analogue measurement signals from crack sensors. After multiplexing and sampling these measurement signals the crack testing electronics module 10 arranges the inspection data into files. The files may then be transmitted to the control and data storage module 6 for storage.

In comparison with the PSET unit 15, the crack sensors and associated electronics provide increased sensitivity regarding crack detection within a tested pipeline.

The untethered in-line inspection tool 1 may comprise further additional components to ensure a reliable and safe operation on site including tool location and tracking receivers as well as appropriate equipment for launching and receiving the tool.

It will be appreciated by the skilled reader that one or more of the described units may be combined into a single unit. For example the PSET electronics module 7 and the PSET magnetiser and sensors module 8 may be combined to form a single PSET module. Similarly, the crack sensor module 9 and the crack testing electronics module 10 may be combined to form a single crack detection module.

Operation of the in-Line Inspection Tool

An explanation of PSET techniques, and hence the operation of the untethered in-line inspection tool 1 will now be described with reference to FIGS. 4 to 6.

Figure 4:
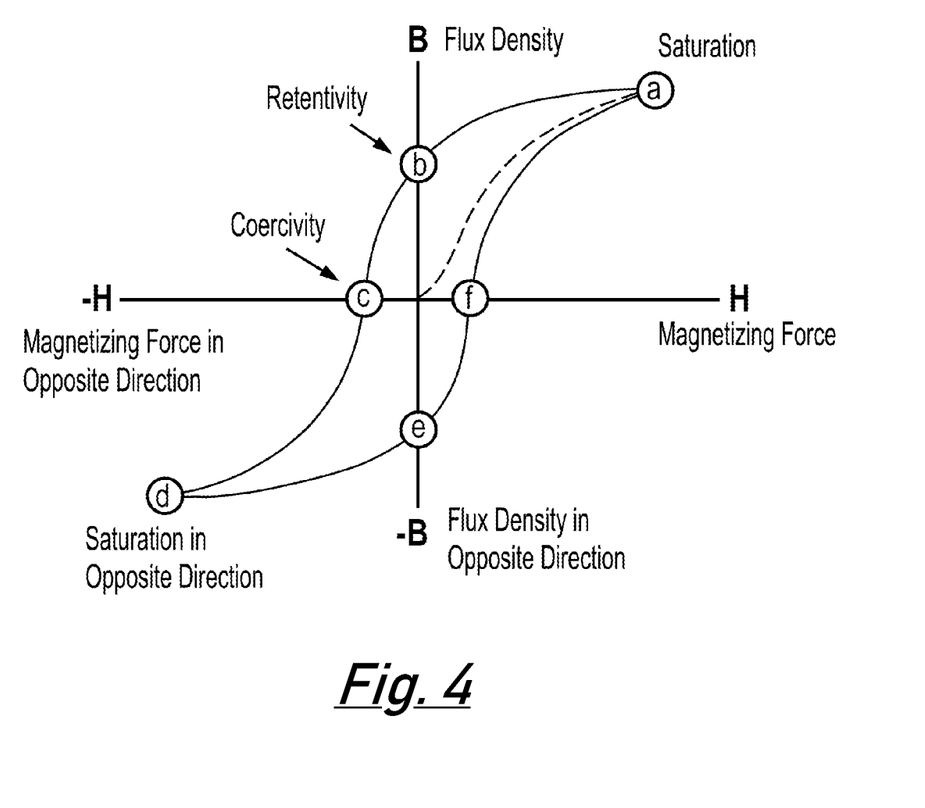
FIG. 4 presents an example hysteresis curve produced when a DC magnetic field is applied to a test component e.g. a pipeline.
Figure 5A:
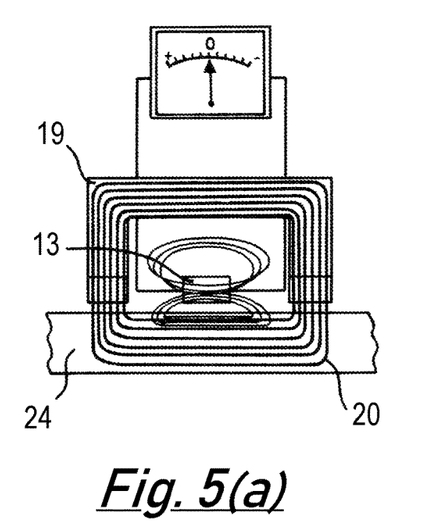
FIG. 5(a); presents schematic representations of a DC magnetic field applied to a ferromagnetic material e.g. a pipeline.
Figure 5B:
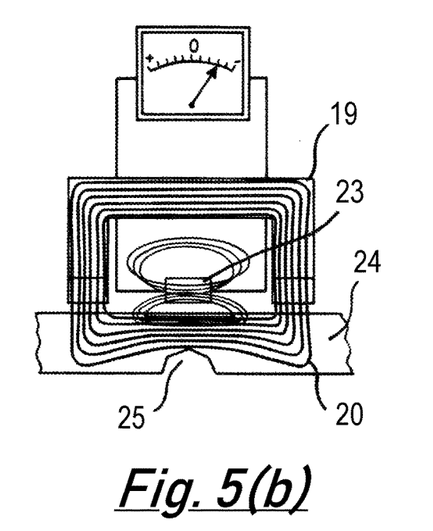
FIG. 5(b); presents schematic representations of a DC magnetic field applied to a ferromagnetic material containing a defect e.g. a pipeline.
Figure 6:
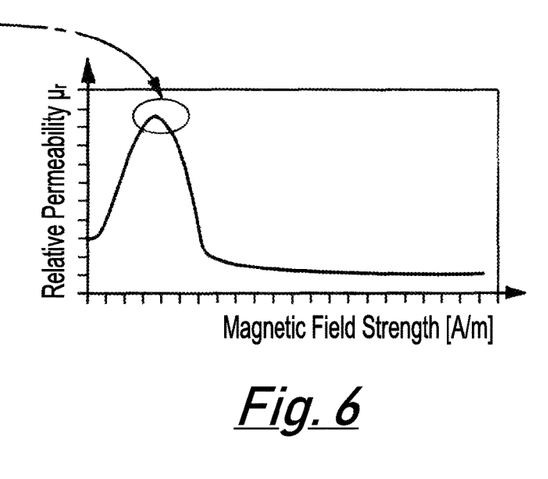
FIG. 6 presents an example graph of relative permeability $\mu_r$ versus magnetic field strength produced by a PSET unit of FIG. 3.

In particular, FIG. 4 provides a typical hysteresis curve produced when a DC magnetic field 20 is applied to a ferromagnetic material 24 (e.g. a tubular component such as a pipeline) as illustrated in FIG. 5. As discussed above, MFL techniques involve applying a magnetic field to the ferromagnetic material that is being tested so as to fully saturate the material e.g. place the material as near as possible to point "a" or "d" on the hysteresis curve. Historically in the oil and gas industry this has required the employment of powerful electromagnets. By comparison, the inventors have found that a PSET technique, that only requires the generation of DC magnetic field 20 strength so as to "partially saturate" the material to be tested can be employed as an efficient and highly sensitive non-destructive testing technique to detect flaws within the ferromagnetic material 24 (e.g. detection of corrosion on the outer surface of a pipeline). In this context "partial saturation" refers to the point on the hysteresis curve where the Flux Density exhibits its highest rate of change e.g. at the retentivity points "b" or "e" within FIG. 4, depending on the polarity of the applied DC magnetic field 20.

The "partial saturation" of the test component is found to have several effects as will also be discussed with reference to FIG. 5. In the first instance it changes the permeability of the test material 24 and so the penetration depth for the eddy current sensors 13 is increased. At the same time changes in the permeability, due to a different flux distribution, become visible see for example FIG. 5(b). As a result defects 25 embedded in the test component 24 can now be detected by the eddy current sensors 13.

The principle of measurement is comparable to MFL measurement, but the set-up works at significantly lower levels of magnetisation. Since only moderate levels of magnetisation are required, the method works to higher wall thickness pipe, or through several millimetres of coating thickness. The coating of the test components may even be metallic, if the operating frequency the eddy current sensors 13 is varied. Optimum signal/noise ratio and signal phase separation between the internal defect indications and other indications need to be considered when selecting a suitable operating frequency the eddy current sensors 13.

As signals detected by the eddy current sensors 13 are measurement of the complex impedance of the coils, they can be represented in a plane. The detected signals thus have an amplitude and a phase and the appropriate selection of the phase allows discrimination between specific defect types. The combination of the PSET electronics module 7 and the PSET magnetiser and sensors module 8 is therefore able to detect the following types of defects:

1) External metal loss defects;
2) Internal metal loss defects
3) Internal crack like defects;
4) Erosion defects; and
5) Internal mass loss.

As will be apparent to the skilled reader, PSET is a relative or comparative testing technique and so the untethered in-line inspection tool 1 must be calibrated on reference samples with artificial damage and defects 25 so as to identify the type and severity of a defect. However, as the relative permeability $\mu_r$ of a test material 24 is a function of the magnetic field strength 20 applied to the material 24, this fact can be exploited to find the retentivity point "b" or "e" by simply increasing the applied magnetic field strength from zero (0) A/m upwards to a maximum level. From the graph presented in FIG. 6 it can be seen that the highest point of relative permeability $\mu_r$ is at a dedicated level dependant on the wall thickness of the test material 24.

Figure 7:
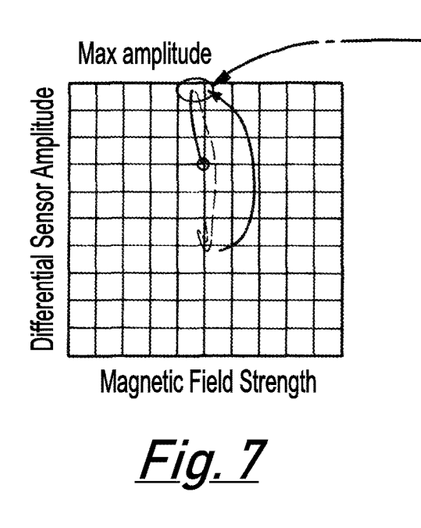
FIG. 7 present an example signal response produced by an eddy current differential sensor of the PSET unit of FIG. 3.

Furthermore, the eddy current sensors 13 of the PSET unit 15 can be employed to help find the point of highest relative permeability on the calibration tubular component. In the first instance the untethered in-line inspection tool 1 is located within the calibration tubular component such that one of the PSET units 15 is positioned at a point on the inner surface of the calibration tubular component opposite to an artificial defect located on the outer surface, see for example FIG. 5(b). Next the differential eddy current sensor 13 is balanced to zero. The DC magnetic field strength 20 is then increased from zero by movement of the backing plate 21. This results in a typical signal response of the differential sensor as presented in FIG. 7. As the magnetic field strength 20 is increased further the amplitude rises until it reaches its maximum value. This eddy current signal maximum value corresponds with the maximum relative permeability, and hence position "b" or "e" on the hysteresis curve.

With the DC magnetic field strengths 20 of the PSET units 15 set to coincide with the maximum amplitude experienced by the eddy current sensors 13 during calibration the untethered in-line inspection tool 1 can then be launched into the pipeline and inspection of the condition of tubular component can be performed.

As the untethered in-line inspection tool 1 propagates along the pipeline the PSET electronics module 7 and the PSET magnetiser and sensors module 8 gather and process PSET data results.

At this time, data relating to the distance covered, and the speed of the untethered in-line inspection tool 1 may be gathered by the odometer 5.

Similarly, the crack sensor module 9 and a crack testing electronics module 10 may be employed to gather and process further data relating to the presence of internal cracks within the pipeline.

Although the PSET magnetiser and sensors module 8 is capable of detecting internal crack like defects there are advantages for the untethered in-line inspection tool 1 to comprise separate crack sensor modules 9. In particular, such components are more reliable for detecting cracks embedded within welds of the pipeline, in the CRA or clad layer and are also found to be able of detecting cracks that are smaller in length.

The data gathered and processed by the various modules of the untethered in-line inspection tool 1 is then saved within the control and data storage module 6.

Upon completion of a test run, the inspection data is simply downloaded from the control and data storage module 6 to an external computer processing unit (e.g. a laptop) or an external memory storage unit (e.g. a USB memory unit) for further processing in due course.

It will be appreciated that a test run of the untethered in-line inspection tool 1 may comprise one or more passes of the untethered in-line inspection tool 1 along a pipeline.

The described in-line inspection tool 1 provides a number of significant advantages over the apparatus and methods known in the art. In the first instance, the use of PSET techniques allows the in-line inspection tool 1 to operate with the a wider range of pipeline types, and in particular the new types of pipelines being employed within the oil and gas industry e.g. CRA lined pipes; CRA clad pipes; solid CRA pipes; duplex pipes; super duplex pipes; solid carbon steel pipes, heavy wall pipes and pipelines that are difficult to be cleaned.

A second advantage arises from the fact that PSET requires significantly lower levels of magnetisation of a test component when compared with the known MFL testing techniques. As a result, the full functionality of the in-line inspection tool 1 can be achieved through the employment of one or more battery modules. This offers the significant advantage that the in-line inspection tool 1 does not need to employ an umbilical or wireline in order to provide power to one or more electromagnets, as is the case for in-line inspection tools configured to perform MFL testing i.e. it is of an untethered design. Instead, low power variable permanent magnets are employed.

Unlike ultrasonic testing, the described in-line inspection tool 1 does not require the use of a coupling fluid. As a result the cleaning requirements are reduced when compared with those tools that deploy ultrasonic testing techniques.

The untethered in-line inspection tool 1 has been able to accurately inspect carbon steel pipelines with wall thicknesses up to 32 mm. This is around a factor of two greater than can be achieved with MFL testing techniques.

An untethered in-line inspection tool for the non-destructive testing of a tubular test component is described which comprises one or more partial saturation eddy current testing (PSET) modules configured to locate with an internal surface of the test component. The one or more PSET modules comprise a variable strength permanent magnet for generating a variable DC magnetic field within the test component and at least one eddy current sensor. Having an in-line inspection tool that employs PSET techniques allows the in-line inspection tool to operate with an increased range of pipeline types. For the detection of cracks the in-line inspection tool may also comprise one or more crack detection modules. The in-line inspection tool further comprises one or more battery modules. Employing a dedicated battery module removes any need to employ an umbilical or wireline in order to provide power to one or more electromagnets.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An untethered in-line inspection tool for a non-destructive testing of a tubular test component, the in-line inspection tool comprising one or more partial saturation eddy current testing (PSET) modules configured to locate with an internal surface of the tubular test component, the one or more PSET modules comprising a variable strength permanent magnet for generating a variable DC magnetic field within the tubular test component and at least one eddy current sensor, wherein the variable strength permanent magnet comprises a backing plate connected between poles of the variable strength permanent magnet, wherein the backing plate is moveable relative to the poles so as to provide a means for adjusting a strength of the DC magnetic field generated by the variable strength permanent magnet.

2. The untethered in-line inspection tool as claimed in claim 1, wherein the in-line inspection tool further comprises one or more battery modules.

3. The untethered in-line inspection tool as claimed in claim 2, wherein one of the one or more battery modules comprises switch-on electronics.

4. The untethered in-line inspection tool as claimed in claim 1, wherein the in-line inspection tool further comprises one or more crack detection modules.

5. The untethered in-line inspection tool as claimed in claim 1, wherein the in-line inspection tool further comprises a marker and tow module.

6. The untethered in-line inspection tool as claimed in claim 5, wherein the marker and tow module comprises a transmitter that provides a means for location of the in-line inspection tool to be tracked.

7. The untethered in-line inspection tool as claimed in claim 5, wherein the marker and tow module comprises a power source.

8. The untethered in-line inspection tool as claimed in claim 5, wherein the marker and tow module comprises one or more sealing cups.

9. The untethered in-line inspection tool as claimed in claim 1, wherein the in-line inspection tool further comprises an odometer.

10. The untethered in-line inspection tool as claimed in claim 9, wherein the odometer comprises a means for recording distance information.

11. The untethered in-line inspection tool as claimed in claim 1, wherein the in-line inspection tool further comprises a control and data storage module.

12. The untethered in-line inspection tool as claimed in claim 11, wherein the control and data storage module comprises an interface connector that provides a wireless communication means for the in-line inspection tool.

13. The untethered in-line inspection tool as claimed in claim 1, wherein the one or more PSET modules comprise a PSET electronics module and a PSET sensors module wherein the PSET electronics module receives and processes analogue measurement signals detected by one or more sensors of the PSET sensors module.

14. The untethered in-line inspection tool as claimed in claim 1, wherein the one or more PSET modules comprise one or more PSET units, and wherein the one or more PSET units comprise the variable strength permanent magnet and the at least one eddy current sensor.

15. The untethered in-line inspection tool as claimed in claim 14, wherein the one or more PSET units are pivotally mounted between stabilizer wheels.

16. The untethered in-line inspection tool as claimed in claim 1, wherein the at least one eddy current sensor is located between poles of the variable strength permanent magnet.

17. A method of non-destructive testing of a tubular test component the method comprising:
  moving a backing plate connected between poles of a variable strength permanent magnet of an untethered in-line inspection tool to set a DC magnetic field strength the variable strength permanent magnet to a retentivity point of a magnetic hysteresis curve of the tubular test component;
  locating the untethered in-line inspection tool within the tubular test component so as to partially saturate the tubular test component with the set DC magnetic field; and
  employing at least one eddy current sensor of the untethered in-line inspection tool to perform an eddy current test on the partially saturated tubular test component.

18. The method of non-destructive testing of the tubular test component as claimed in claim 17, wherein the eddy current test comprises a differential mode eddy current test.

19. The method of non-destructive testing of the tubular test component as claimed in claim 18, wherein the differential mode eddy current test comprises detecting an amplitude and a phase of one or more eddy current signals.

20. The method of non-destructive testing of the tubular test component as claimed in claim 19, wherein the detected amplitude and phase of the one or more eddy current signals are employed to identify one or more defects within the tubular test component.

21. The method of non-destructive testing of the tubular test component as claimed in claim 17, wherein the setting of the DC magnetic field strength of the variable strength permanent magnet of the in-line inspection tool comprises:
  locating the untethered in-line inspection tool with a first surface of a reference sample, the reference sample comprising an artificial defect incorporated on a second, opposite surface thereof; and
  varying the DC magnetic field strength of the variable strength permanent magnet to ascertain a DC magnetic field strength that coincides with a maximum amplitude of a signal detected by the at least one eddy current sensor.

22. The method of non-destructive testing of the tubular test component as claimed in claim 17, wherein the method further comprises recording PSET data results as the untethered in-line inspection tool travels through the tubular test component.

23. The method of non-destructive testing of the tubular test component as claimed in claim 17, wherein the method further comprises recording at least one of (i) a distance covered and (ii) a velocity of the untethered in-line inspection tool as it travels through the tubular test component.

24. The method of non-destructive testing of the tubular test component as claimed in claim 17, wherein the method further comprises employing the at least one eddy current sensor of the untethered in-line inspection tool to perform the eddy current test on a non-saturated tubular test component.

25. The method of non-destructive testing of the tubular test component as claimed in claim 17, wherein the method further comprises running the untethered in-line inspection tool along one or more passes of the tubular test component.

* * * * *